Patented June 20, 1933

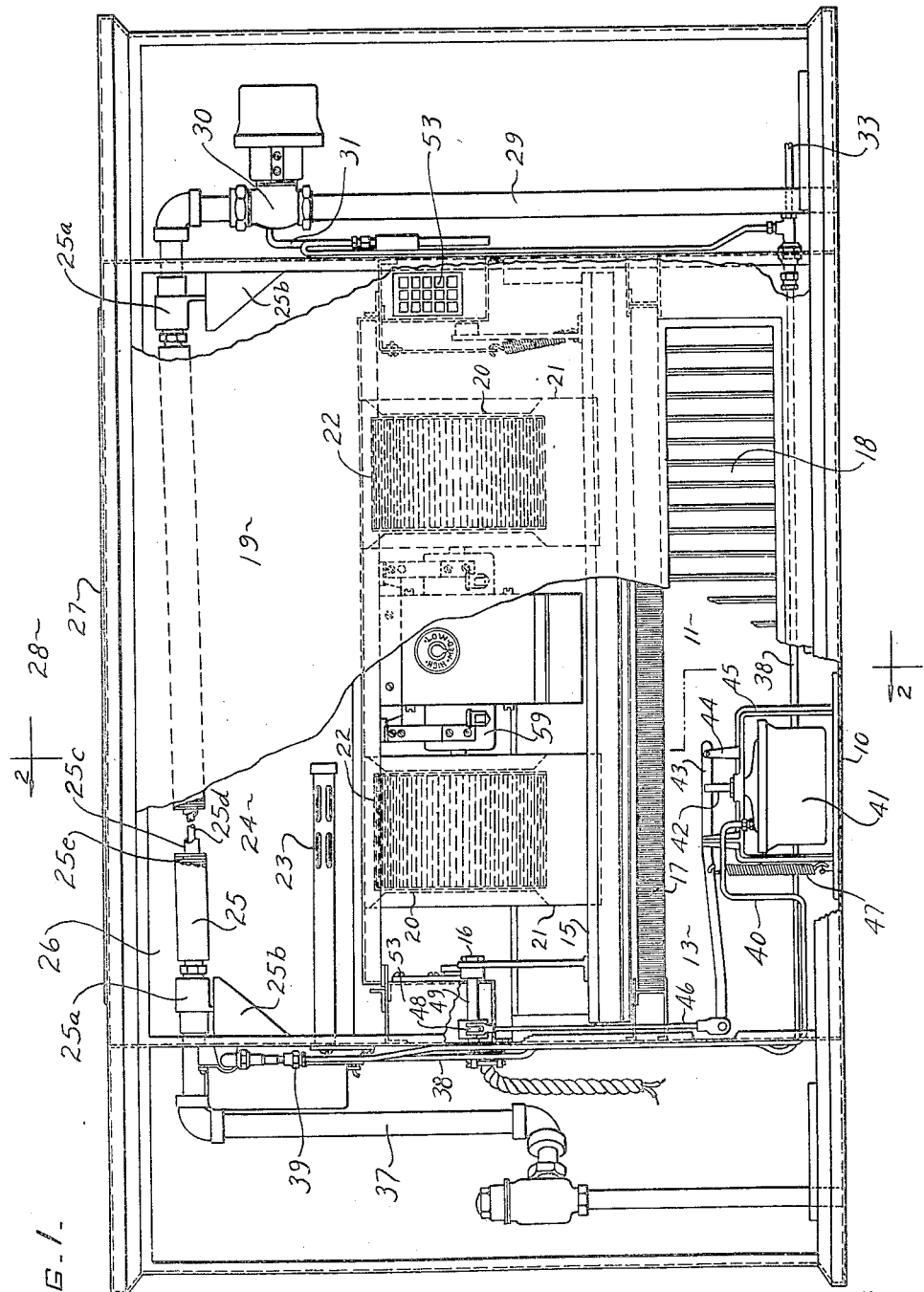

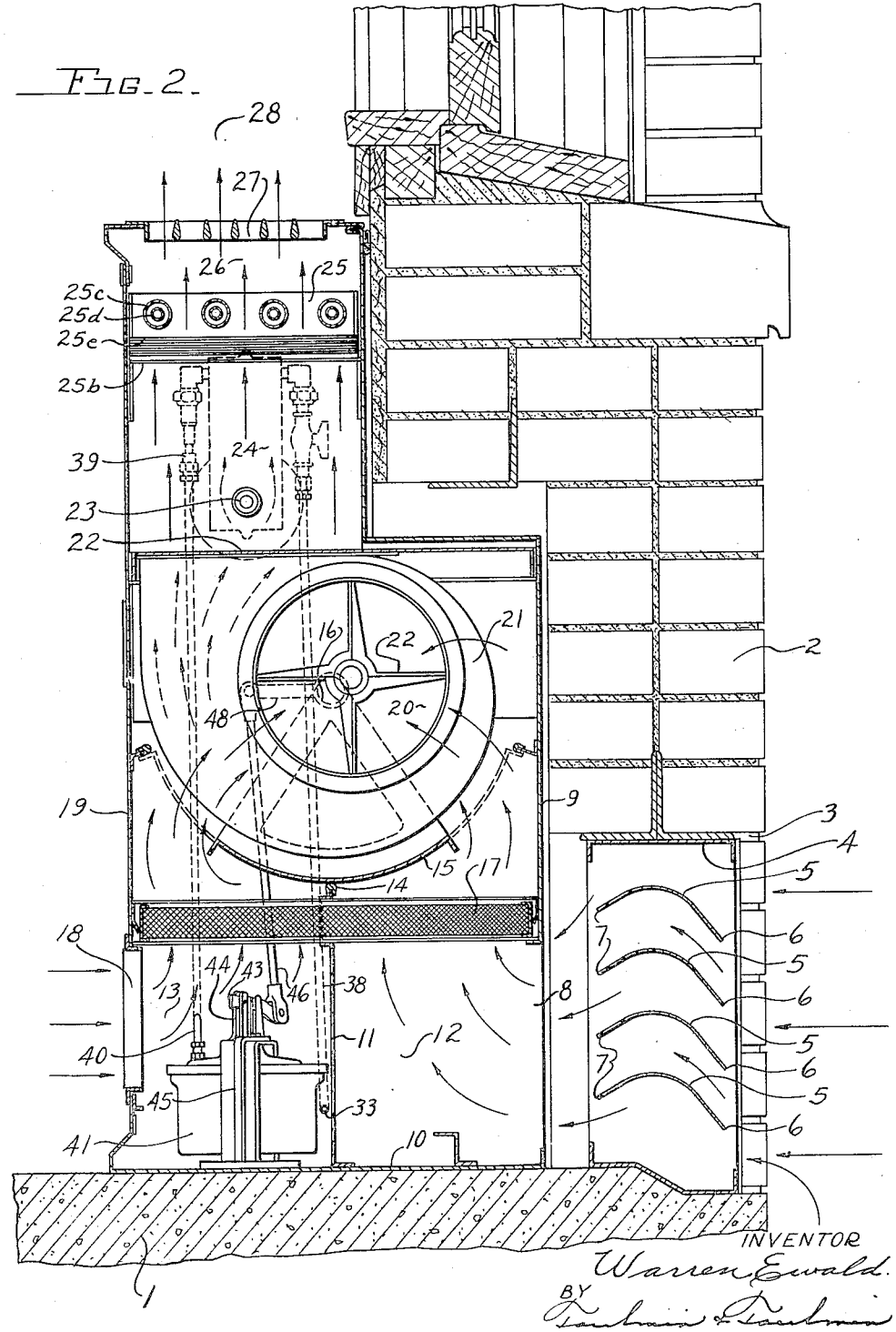

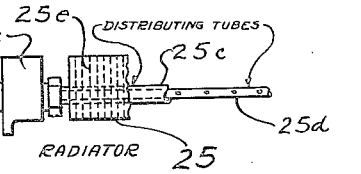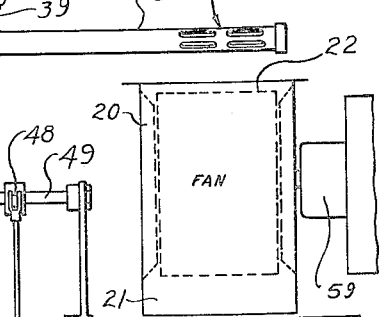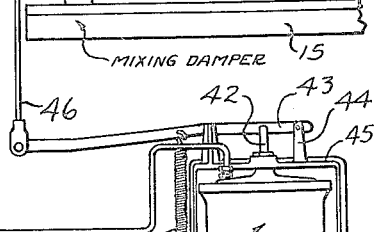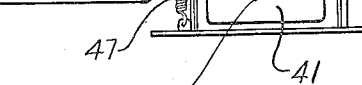

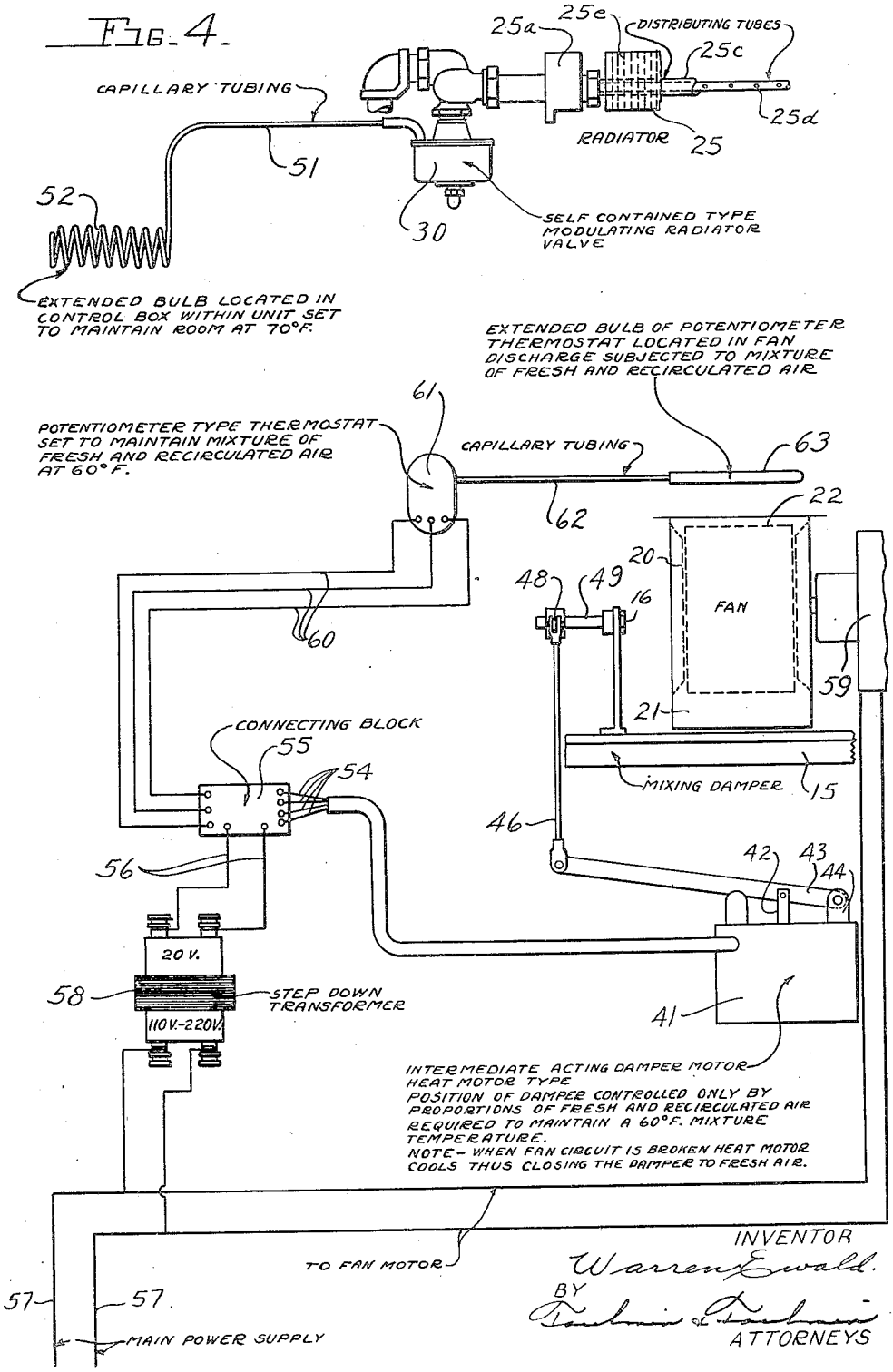

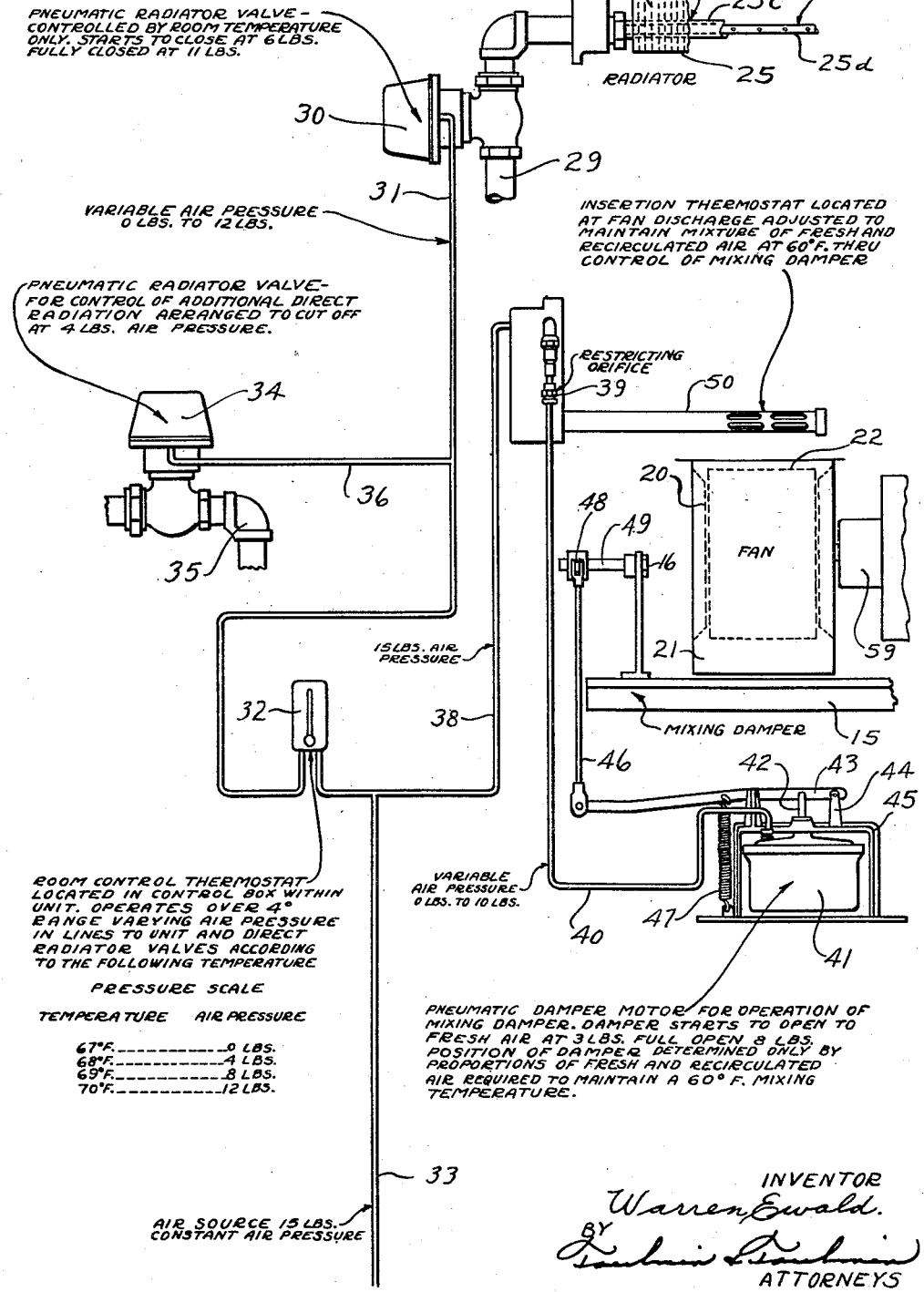

1,914,712

UNITED STATES PATENT OFFICE

WARREN EWALD, OF COLUMBUS, OHIO, ASSIGNOR, BY MESNE ASSIGNMENTS, TO BUCKEYE BLOWER COMPANY, OF COLUMBUS, OHIO, A CORPORATION OF DELAWARE

HEATING AND VENTILATING APPARATUS

Application filed June 4, 1932. Serial No. 615,411.

REISSUED

My invention relates to heating and ventilating apparatus, and in particular to heating and ventilating units.

In particular, it is the object of my invention to devise such a unit which mixes automatically room air and outside air in the right proportion to maintain an air stream temperature of a minimum degree after the room has once been prepared for occupancy; and to furnish the additional heat required to raise the temperature of the incoming air to the desired final temperature by a single radiator in the unit, the volume of steam supplied to which is regulated by the room temperature.

It is my object to provide the combination of a radiator with room control and the mixing of two air streams in accordance with the proportions required to maintain a discharge temperature at the fans of a predetermined degree of temperature, such as, for instance, by way of illustration, 60 degrees.

It is my object to eliminate multiple radiators.

It is my object to provide outdoor air in indefinite quantity which is supplied at all times during occupancy. This volume of outdoor air does not vary as changes occur in either room or outside temperatures. The control for a unit of my invention is so arranged that the volume of outdoor air mixed with room air recirculated through the unit varies in accordance with the changes in either the outside temperature or the room temperature, but, regardless of outside temperature, there is always supplied a certain amount of outside air after the room is up to temperature.

In particular, it is my object to mix two air streams, one from the room and the other from outdoors in such proportion as to maintain a constant discharge temperature at the fans before the air passes through the radiator.

It is my object to control the proportioning of the fresh air and recirculated air by a thermostat located at the fan discharge, at which point the room and outside air is most thoroughly mixed.

It is a further object to provide a thermostat at the discharge of the fan housing which remains inoperative until the room temperature reaches a predetermined minimum temperature, for instance, by way of illustration, 60 degrees, assuming that the desired room temperature is 70 degrees.

After this temperature is established in the room, the stat regulates the operation of the inlet and recirculating mixing damper to maintain the predetermined minimum temperature at the discharge of the fan, whereby the control thermostat at the outlet of the fan establishes a definite minimum temperature at which air can be introduced into the room even though all of the steam is cut off from the radiator, thus definitely eliminating drafts because the air cannot be discharged into the room below 60 degrees.

It is a further object to prevent the circulation in a room of air at a temperature of less than 10 degrees below the desired room temperature so as to prevent creating drafts which will be injurious to the occupants.

It is a further object to provide a heating and ventilating unit which can dispense with direct radiation.

It is a further object to provide fresh air inlet guide vanes which increase the capacity of incoming air while, at the same time, prevent the inlet of rain, snow, particularly under wind pressure.

It is a further object to provide a one-piece damper in combination with a vertical stationary partition between the inlet and recirculation air openings, which damper is adapted to proportion the air that enters the fan from the two sources where it is thoroughly mixed before discharge over the thermostat controlling the motor which operates the one-piece damper.

Referring to the drawings:

Figure 1 is a front elevation of the heating and ventilating unit partially broken away to show the arrangement of the parts and the interior of the unit casing;

Figure 2 is a section on the line 2—2 of Figure 1;

Figure 3 is a diagrammatic view of the arrangement of the thermostatic controls showing the use of compressed air as an operating medium;

Figure 4 is a modified form of such controls showing the use of electric current as an operating medium;

Figure 5 is a diagrammatic view of another form of compressed air as an operating medium.

Referring to the drawings in detail, 1 is the floor of an enclosure having a wall 2 through which is pierced an air inlet opening 3 carrying a frame 4 in which are located a plurality of spaced superimposed guide vanes having arcuate, transversely-arranged bodies 5, the other ends of which at 6 are lower than the inner ends at 7. The concave sides of these arcuate guide vanes are arranged downwardly in superimposed, spaced, concentric relationship one to the other. The opening in the casing 4 is of greater depth than the air inlet opening for fresh air designated 8 at the base of the unit heater and ventilator casing designated 9. The uppermost guide vane 5 is above the top of the opening 8. It will be noted that the incoming fresh air must travel upwardly as it enters through the inlet opening casing 4 and thence downwardly through the opening 8 and again upwardly. This results in slowing down the speed of the air and results in the precipitation of dust moisture and snow before it can enter into the unit heater and ventilator casing 9 without a decrease in the air supply. In fact, a material increase in the air supply has been noted over previous structures.

The incoming fresh air is guided vertically upwardly from the bottom 10 of the casing by the vertical partition 11 which separates the inlet air compartment 12 from the recirculated air compartment 13. This partition extends upwardly to the sealing member 14 which yieldingly engages the bottom of the single arcuate damper 15 which is pivoted at 16. Above the compartments 12 and 13 is a horizontally-disposed filter 17. 18 indicates the air inlet opening in the front 19 of the housing of the unit. Through this opening 18 recirculated air enters the compartment 13, passes through the filter 17 around the damper 15 and thence into the eye 20 of the fan housing 21 where it is mixed by the fan 22 with incoming fresh air which likewise enters the eye of the fan 20. The fan discharges through the casing 21 out the top opening 22 over the control thermostat 23 into the compartment 24 whence it passes through the radiator 25. Thence it passes through the chamber 26 out of the exit grille 27 into the room 28.

The radiator 25 consists of a header 25a at either end resting on brackets 25b with steam pipes 25c, distribution pipes 25d and air guide plates for fins 25e mounted on the steam pipes 25c.

Steam is supplied through the pipe 29 which supply is controlled by a valve 30 that is closed by air pressure applied through the air line 31. The application of this air pressure depends upon the room thermostat 32. 33 indicates the air supply pipe. If it is desired to use room direct radiation outside of the unit, the valve 34 on the steam supply line 35 for such a radiator is also supplied with an operating air pipe 36.

Returning to the radiator 25 the pipe 37 is the exit pipe from the radiator.

The supply line 33 may also supply through the branch 38 through a restricted orifice pipe 39 an air motor line 40 connected to the pneumatic damper motor 41 to operate the plunger 42, lever 43, which is pivoted at 44 on the bracket 45. To the free end of this lever 43 is connected the pitman 46, the movement of which is restrained by the spring 47 connected to the frame 45 and to the lever 43.

The pitman 46 is in turn connected to a lever 48 on the pivot shaft 49 on which is supported the mixing damper 15. This serves to operate the damper 15 when air is applied to the motor 41.

The application of this air depends upon the effect upon the mixed air thermostat 50 of the mixed air flowing from the orifice 22 from the fan casing 21.

If an electric system is to be employed, as shown in Figure 4, then the radiator 25 and its valve 30, which is a self-contained type of modulating radiator valve, will be controlled by the expansion of a liquid affected by heat in the capillary tube 51.

The coil of this tube 52 constitutes an extended bulb located in a control box 53 within the unit which is set to maintain room temperature at some predetermined degree, such as 70 degrees F.

The mixing damper 15 has its control motor 41 operated as a heat motor through the electric cables 54 which are supplied through the incoming block 55 with 20-volt current through the line 56.

The main power supply is taken in through the lines 57, part of which goes to the transformer 58 and the other part to the fan motor 59.

From the incoming block 55 there are electric connections 60 to a potentiometer thermostat 61 having a capillary tube 62 with an extended bulb 63 located in the space above the fan where the mixed air is discharged.

The operation is the same in both types of control.

Referring to Figure 5 it will be noted that there is a variation in the application of the pneumatic power in that the branch 38 is taken direct from the pressure line 33 in advance of the thermostat 32 for the room. The thermostat therefore controls the application of air to the unit radiator and to the room radiator if one is used, but does not control, as in Figure 3, the application of the air to the line controlled by the discharge thermostat 50.

*Method of operation*

Assuming that the room is unoccupied and it is desired to start up the system to prepare the room for occupancy, the spring 47 will have closed the damper 15 across the fresh air inlet opening. The fan is started so that the recirculated air will commence to circulate through the unit. At this time, the thermostat 32 will be open to permit the passage of operating fluid, such as air or electricity, to operate the valve 30, possibly the valve 34, in order to heat up air in the room to prepare it for occupancy.

The thermostat 50, however, will prevent the application of air pressure through the line 40 or the application of electricity through the wires 54 to operate the motor 41 to open the damper so that the spring 47 keeps the damper 15 closed to prevent the entrance of cold fresh air.

The thermostat 50 maintains the motor 41 inoperative until the recirculated air passing out of the fan opening 22 reaches 60 degrees, for instance. For the purpose of illustration, I shall assume that we desire a room temperature of 70 degrees and I, therefore, prefer to have the thermostat 50 become operative at 10 degrees below the room temperature. As the thermostat 50 begins to permit the admission of air through the line 40, the motor 41 will be operated and the damper 15 will move to admit fresh air for mixture by the fan in the fan housing 21. Thereafter, the thermostat 32 or the coil 52 of the extended bulb thermostat will serve to regulate radiators, preferably the single radiator in the unit, to keep the room temperature at 70 degrees while the thermostat 50 will regulate the admission of fresh air so as to have a constant discharge temperature from the fans of mixed air at 60 degrees prior to the entry into the radiator 25 from which radiator the air will issue at 70 degrees.

It will be understood that the relative degrees of temperature are mentioned purely by way of illustration.

It will be further understood that different mediums of control may be employed for the several elements of the invention without departing from the spirit of the invention.

It will be further understood that, regardless of outside temperature, the unit always supplies a certain amount of outside air after the room has once been brought up to temperature suitable for occupancy.

The principle is the mixing of the two air streams, one from the room and one from outdoors, in such proportion as to maintain a constant discharge temperature at the fan outlet before the air passes through the radiator of about 10 degrees below the temperature to be maintained in the room. The volume of outdoor air does not vary as changes occur in either the room or outside temperatures.

The volume of steam supply to the radiator 25 is regulated by the room temperature as the stat 32 or 52 is influenced by the temperature of the air in the room.

It will further be understood that the exact mechanical arrangement of the parts or the particular character of the mechanism of the parts is not important so long as the principle of operation and the essential equivalent pieces of mechanism are employed so as to secure the result of my invention.

It will be understood that I desire to comprehend within my invention such modifications as may be necessary to adapt it to varying conditions and uses.

Having thus fully described my invention, what I claim as new and desire to secure by Letters Patent, is:

1. In combination, in a unit heater and ventilator, of a casing having a recirculated air inlet and a fresh air inlet so arranged as to discharge said fresh and recirculated airs into a fan, a fan in which said airs are mixed and from which it is discharged, a control thermostat in the path of said discharged mixed air, damper means connected thereto for determining the proportion of fresh and recirculated air admitted to the fan, and a radiator adjacent said thermostat for heating said mixed air, said radiator being located beneath an air exit opening from the unit.

2. In combination, in a unit heater and ventilator, of a casing having a recirculated air inlet and a fresh air inlet so arranged as to discharge said fresh and recirculated airs into a fan, a fan in which said airs are mixed and from which it is discharged, a control thermostat in the path of said discharged mixed air, damper means connected thereto for determining the proportion of fresh and recirculated air admitted to the fan, a radiator adjacent said thermostat for heating said mixed air, said radiator being located beneath an air exit opening from the unit, and means of separating the recirculated air and fresh air when admitted to the casing until approximately the time of entry into the fan.

3. In combination, in a unit heater and ventilator, of a casing having a recirculated air inlet and a fresh air inlet so arranged as to discharge said fresh and recirculated airs into a fan, a fan in which said airs are mixed and from which it is discharged, a control thermostat in the path of said discharged mixed air, damper means connected thereto for determining the proportion of fresh and recirculated air admitted to the fan, a radiator adjacent said thermostat for heating said mixed air, said radiator being located beneath an air exit opening from the unit, and means of separating the recirculated air and fresh air when admitted to the casing until approximately the time of entry into the fan, said means comprising a vertical partition from the bottom of the unit to a point adjacent the fan.

4. In combination, a unit having a recirculating air inlet, a fresh air inlet, a partition therebetween extending partially through said casing, a single damper engageable with said partition adapted to regulate the proportions of fresh and recirculated air delivered above said partition, a fan for receiving said air and mixing it, said fan discharging upwardly, a radiator for said discharge beneath an air outlet opening in said casing, and means for regulating the position of the damper located between said fan discharge and said radiator.

5. In a unit heater and ventilator having a casing with an air inlet opening for recirculated air and a fresh air opening on opposite sides of the bottom thereof, a partition between said openings extending to a point above said openings, an arcuate damper swinging from side to side of said casing engageable with said partition, a fan over said damper, a thermostat at the discharge of said fan, a radiator over said discharge and said thermostat beneath an air outlet opening from the casing, a motor connected to said damper for operating it regulated by said thermostat.

6. In a unit heater and ventilator having a casing with an air inlet opening for recirculated air and a fresh air opening on opposite sides of the bottom thereof, a partition between said openings extending to a point above said openings, an arcuate damper swinging from side to side of said casing engageable with said partition, a fan over said damper, a thermostat at the discharge of said fan, a radiator over said discharge and said thermostat beneath an air outlet opening from the casing, a motor connected to said damper for operating it regulated by said thermostat, said thermostat being arranged to maintain said motor for the damper inoperative until a predetermined temperature of the air in the room has been accomplished by said radiator, and means for maintaining said damper in closed position to prevent the entrance of fresh air until that temperature has been attained.

7. In combination in a building having an air inlet opening, a frame having a plurality of superimposed, transversely arranged, spaced, arcuate guide vanes having their inner edges directed downwardly and their outer edges lower than their inner edges, and a unit heater and ventilator having an air inlet opening adjacent the inner edges of the vanes of lesser height than the air inlet of the building whereby the fresh air enters by first going upwardly, then downwardly to enter the room and thence upwardly.

8. In a system of control for a unit heater and ventilator, a unit having a radiator, a thermostat controlling the application of heating fluid to said radiator located in said unit and influenced by the temperature of room air, a fan in said unit, said unit having means for introducing fresh and recirculated air, a damper for controlling the portions of said fresh and recirculated air, a thermostat over the discharge of said fan beneath said radiator for controlling the proportions of said fresh and recirculated air in order to maintain a predetermined temperature of the mixed air at the discharge of the fan.

9. In a system of control for a unit heater and ventilator, a unit having a radiator, a thermostat controlling the application of heating fluid to said radiator located in said unit and influenced by the temperature of room air, a fan in said unit, said unit having means for introducing fresh and recirculated air, a damper for controlling the portions of said fresh and recirculated air, a thermostat over the discharge of said fan beneath said radiator for controlling the proportions of said fresh and recirculated air in order to maintain a predetermined temperature of the mixed air at the discharge of the fan, and an electric circuit for operating the fan, and an electric circuit for operating said damper.

10. In combination, a common air pressure line, a thermostat controlling said line, branches from said line to valves controlling a unit radiator and a room radiator, a branch from said line to a damper motor, and a thermostat in the path of a mixed air current associated with said damper motor for preventing the operation thereof until the predetermined temperature has been attained.

11. In a system of heating and ventilating control, a common air pressure line, one branch therefrom connected to a mixing damper motor, a thermostat in the path of a mixed air current controlling the application of air to said motor to prevent the application of air until a predetermined temperature has been obtained, a second branch from said common air line having a room thermostat therein controlled by the temperature of the room in which it is located, and a radiator valve and radiator operated by air in said second branch.

In testimony whereof, I affix my signature.

WARREN EWALD.